United States Patent [19]

Bähr et al.

[11] 4,368,101
[45] Jan. 11, 1983

[54] METHOD AND APPARATUS FOR THE PRODUCTION OF A SUSPENSION OF FIBROUS MATERIAL MADE FROM WASTE-PAPER

[75] Inventors: Theodor Bähr; Lothar Pfalzer, both of Heidenheim, Fed. Rep. of Germany

[73] Assignee: J. M. Voith GmbH, Fed. Rep. of Germany

[21] Appl. No.: 208,789

[22] Filed: Nov. 20, 1980

[30] Foreign Application Priority Data

Nov. 28, 1979 [DE]  Fed. Rep. of Germany ....... 2947862

[51] Int. Cl.³ ........................... D21B 1/32; B21C 5/02
[52] U.S. Cl. .......................................... 162/4; 162/5; 209/164
[58] Field of Search .................. 162/4, 5, 6, 7, 8; 209/164, 166, 168, 169, 170

[56] References Cited

U.S. PATENT DOCUMENTS

| 3,151,062 | 9/1964 | Duke | 209/166 |
| 4,133,038 | 1/1979 | Niemi | 209/166 |
| 4,213,992 | 7/1980 | Thornton | 209/166 |

FOREIGN PATENT DOCUMENTS 699582 12/1964 Canada ................................... 162/5

2805445 9/1978 Fed. Rep. of Germany ......... 162/4
2813448 9/1978 Fed. Rep. of Germany ......... 162/5

OTHER PUBLICATIONS

Escher Wyss News, vol. 44, 1, 1971, pp. 70–79.

Primary Examiner—William F. Smith
Attorney, Agent, or Firm—Ostrolenk, Faber, Gerb & Soffen

[57] ABSTRACT

The disclosure concerns a method and apparatus for producing a suspension of fibrous material from waste-paper. Following dissolving the waste-paper, cleaning the dissolved suspension and stain removal, the suspension is floated in series of flotation cells. The suspension is first floated through a first series of flotation cells. Thinning liquid medium, such as water, is added to the suspension. It is then floated through a second series of flotation cells. In one embodiment, the cells of the second series are larger than the cells of the first series. Following the second series of cells, the material floated from the second cells is delivered to another cell. In another embodiment, the cells of the second series are themselves divided into two separate rows of cells and the suspension is divided among the rows of second cells. In this embodiment, following flotation through the second cells, the material floated from the second cells is next delivered to joint secondary cells.

7 Claims, 2 Drawing Figures

METHOD AND APPARATUS FOR THE PRODUCTION OF A SUSPENSION OF FIBROUS MATERIAL MADE FROM WASTE-PAPER

BACKGROUND OF THE INVENTION

This invention concerns a method and apparatus for the production of a suspension of fibrous material made from waste-paper including the steps of: dissolving; cleaning; stain removal; and flotation in several flotation cells arranged in series.

After the dissolving of waste-paper into a suspension of fibrous material and the separation of small particles of printing ink, or the like impurities, from the fibers, the particles of printing ink, or the like, are floated out of the suspension of fibrous material with the aid of lime soap. This is generally carried out by means of a row of flotation cells arranged in series, and which the suspension traverses. As a result of this, the particles of printing ink, or the like, float upward, together with the lime soap, and can be removed from the surface of the cells as scum. At present, flotation cells of this kind are only effective with consistencies of suspended matter of 1%.

With thicker consistencies of matter, the beneficial effect of flotation is reduced because the thickness of the greater consistency matter provides resistance to flow which can be too great for bubbles and bits of lime soap. A definite minimum period of dwell time of suspension per cell is required (approximately one minute) and a total minimum time of approximately ten minutes is also required for effective flotation. Thus, in the case of large scale waste-paper processing, one requires corresponding space and either a high number of cells or cells of large volume to achieve a desired level of whiteness of the suspension of fibrous material.

SUMMARY OF THE INVENTION

The object of this invention is to achieve a method and apparatus which provides a higher speed of production of a suspension of fibrous material made from waste-paper, without the degree of whiteness suffering.

The invention provides a method for the production of a suspension of fibrous material made from waste-paper including the steps of: dissolving; cleaning, stain removal; and flotation in several flotation cells arranged in series. Matter having a consistency of more than 1.4% (content of bone dry matter) is passed through a first row of flotation cells. Then the suspension is thinned out by the addition of a suspending thinning medium, typically water, to a consistency of less than 1.4%. Next, the flotation of the less thick matter occurs in one or several rows of flotation cells.

Thus, flotation initially occurs in a region of thick matter. Then any particles of printing ink, or the like, which are still in suspension are carried away in a region of less thick matter.

This method combines the advantages of flotation in the region of thick matter, i.e. the need for fewer cells and less space, and a reduction in cost, with the advantage of flotation in a region of less thick matter, i.e. obtaining a good level of whiteness.

In the flotation of dense matter, e.g. in a region of consistency of 2%, in contrast to a flotation of less thick matter, e.g. in a region of consistency of 1%, one can manage in the region of thick matter either with half the number of cells, or with the correspondingly lower size of cells. Normally, one would expect the degree of whiteness to be lower because of this. Surprisingly, it has been established that if one keeps to a minimum the total length of time for flotation, the degree of whiteness is approximately comparable with the whiteness which one gets with traditional flotation equipment in the region of less thick matter.

Generally, a total flotation time of approximately ten minutes is regarded as necessary. With a flotation time of approximately one minute per cell, ten cells arranged in series are necessary. The distribution of the cells into thick matter and less thick matter cells can be chosen according to the desired level of whiteness. According to need and quality of material, ratios of 6:4, 5:5, or 4:6 may be utilized. Savings in space and money become greater, the longer the matter remains in the region of thick matter, i.e. the more cells of thick matter that are required. Here, if necessary, there must be a compromise in relation to the degree of whiteness desired.

The invention also provides apparatus for carrying out the method of the invention, comprising dissolving, cleaning and stain removal devices and several flotation cells arranged in series. There is a first series or row of cells for the flotation of thick matter. The cells of the first row are substantially equal in size. There is a second series of row of cells for the flotation of less thick matter. The size of each cell of the second row is approximately double the size of each cell of the first row. A thinning medium, i.e. water pipe discharges into a connecting pipe and the connecting pipe extends between the last cell of the first row and the first cell of the second row.

With such apparatus one can work with approximately double the consistency of matter in the area of thick matter, as in the area of less thick matter. However, it is necessary for the cell size of the cells of less thick matter to be approximately double that of the cells of thick matter.

The invention further provides other apparatus for carrying out the method of the invention, comprising dissolving, cleaning and stain removal devices and several flotation cells arranged in series. In particular, there are (a) for the flotation of thick matter, a first row of cells each being substantially the same size;

(b) a thinning medium, i.e. water, pipe discharging into an outlet pipe leading from the last cell of the first row;

(c) at least two branch pipes leading from the outlet pipe;

(d) each branch pipe leading to a respective second row of several cells arranged in series for the flotation of less thick matter, the size of each cell of each second row corresponding approximately to the size of each cell of the first row.

Using such apparatus, one can manage with the same size of cell in both the first and second series, and therefore the cost of production is correspondingly reduced.

Preferably, an outlet pipe for the flotation scum leads from each second row to one or more joint secondary cells.

Other objects and features of the invention will now be understood, with reference to the accompanying drawings.

DESCRIPTION OF THE PREFERRED EMBODIMENTS

Figure 1:
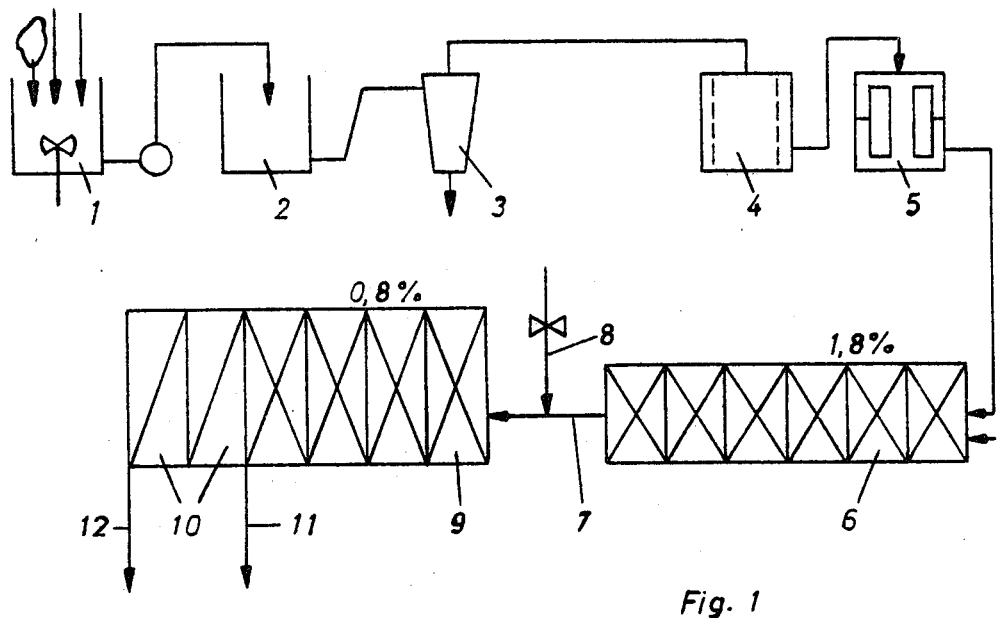
FIG. 1 is a diagrammatic illustration of an embodiment of the invention utilizing six cells of thick matter, four cells of less thick matter and two secondary cells of less thick matter.

Waste-paper, carrying printing ink, or the like undesirable impurities, is dissolved in solvent 1 on addition of water and chemicals (e.g. Na OH, $H_2O_2$, sodium soap), as is well known in this art. Next, the dissolved suspension passes into an intermediate tank 2, from where it is transported into various cleaning devices, e.g. a wet cyclone 3 and a vertical grader 4. The dissolution of bundles of fiber into individual fibers can occur in a stain remover 5.

Instead of this system of dissolving, the waste-paper can alternatively be dissolved, if necessary, by purely chemical means using a reaction column, or by any other mechanical means.

For the separation of the particles of printing ink, or the like, dissolved out of the fibers, the suspension passes into six cells of thick matter 6, arranged in series, according to FIG. 1. Processing time is approximately one minute duration per cell. The consistency of matter is substantially 1.8% and the size of each cell is 5 $m^3$.

A thinning water pipe 8 discharges into the outlet pipe 7 of the last cell of thick matter. Via this pipe either pure water or correspondingly purified suspension or other thinning medium can be added. If necessary, additional chemicals can also be inserted through this pipe.

Via the outlet pipe 7, the suspension passes into a row of four cells of less thick matter 9, which are arranged in series. The water supply via the pipe 8 is regulated in such a way that there is a consistency of matter of approximately 0.8% in the cells 9. For this reason, it is necessary for every cell 9 to be more than double the size of every cell 6 of thick matter.

Subsequent cleaning of the flotation scum occurs in two secondary cells 10. The material of the last flotation cell of less thick matter 9 is led away via a pipe 11 for further treatment. The outlet pipe 12 of the second secondary cell 10 is led to a centrifuge (not shown) for thickening.

As is apparent, in comparison to a traditional row of flotation cells arranged in series in the area of less thick matter of e.g. 10 $m^3$ capacity each, i.e. a total volume of 100 $m^3$, according to the process of FIG. 1, only a total volume of approximately 70 $m^3$ is necessary for the cells.

Figure 2:
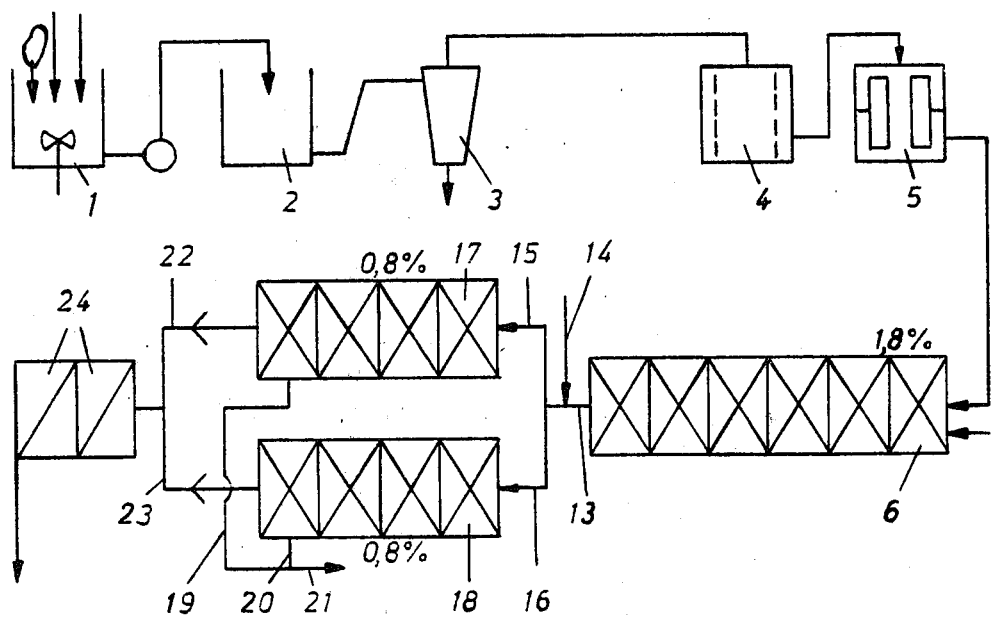
FIG. 2 illustrates an alternative embodiment utilizing six cells of thick matter, two parallel rows each containing four cells of less thick matter, and two joint secondary cells of less thick matter.

FIG. 2 illustrates an alternative embodiment which makes it possible to use equal size cells for both the thick and less thick matter.

Dissolution of the waste-paper occurs in the same manner shown in FIG. 1. Likewise, six cells of thick matter are arranged in series, in which flotation occurs with a consistency of matter of 1.8%. A thinning water pipe 14 discharges into the outlet pipe 13 of the last cell of thick matter 6. An amount of water is supplied through pipe 14 so as to provide a consistency of matter of approximately 0.8%. The outlet pipe 13 branches out from the pipe 14 into two branch pipes 15 and 16. The branch pipes 15 and 16 discharge respectively into cells 17 and 18 which are the first of four flotation cells of less thick matter which are arranged in series. The two pipes 19 and 20 from the last cells of less thick matter discharge into a joint pipe 21, via which the suspension, which has been floated after corresponding thorough cleaning and thickening, is passed to a paper making machine.

Two outlet pipes 22 and 23 from the last cells of less thick matter lead to two secondary cells 24 arranged in series for the subsequent cleaning of the flotation scum.

Although the present invention has been described in connection with preferred embodiments thereof, many variations and modifications will now become apparent to those skilled in the art. It is preferred, therefore, that the present invention be limited not by the specific disclosure herein, but only by the appended claims.

We claim:

1. A method for producing a fibrous suspension from waste-paper, comprising:
    dissolving the waste-paper for forming a suspension of waste-paper, cleaning the resulting pulp suspension, stain removal of the cleaned pulp suspension, and flotation of the pulp suspension, said flotation comprising:
    floating pulp suspension of a relatively thicker first consistency serially through a first series of flotation cells;
    thinning the pulp suspension, by the addition of thinning liquid medium, to a
    second thinner consistency thinner than the first consistency, and
    floating the now thinner consistency pulp suspension serially through at least one further series of flotation cells.

2. The method of claim 1, wherein the thicker consistency is greater than 1.4% of bone dry material and the thinner consistency is less than 1.4%.

3. A method for producing a fibrous suspension from waste-paper, comprising:
    dissolving the waste-paper in the presence of paper dissolving chemicals for forming a pulp suspension of waste-paper, cleaning the resulting pulp suspension, stain removal of the cleaned pulp suspension, and flotation of the pulp suspension, said flotation comprising:
    floating pulp suspension of a relatively thicker consistency serially through a first series of flotation cells;
    thinning the pulp suspension, by the addition of thinning liquid medium, to a thinner consistency, thinner than the first consistency, and
    floating the now thinner consistency pulp suspension serially through at least one further series of flotation cells.

4. Apparatus for producing a suspension of fibrous material from waste-paper comprising;
    means for dissolving the waste-paper into a fibrous pulp suspension, cleaning means for cleaning the fibrous pulp suspension, a stain removal device for the cleaned pulp suspension, and flotation means for following the stain removal device;
    the flotation means comprising;
    a first series of flotation cells, arranged so that the pulp suspension is serially floated in each cell of the first series for a respective time interval;
    two separate series of second flotation cells, and each of the separate series of second flotation cells following and being connected to the end of the first series of flotation cells, whereby the flow of pulp suspension from the first series of cells is divided among the separate series of second flotation cells;

each of the second series of flotation cells being arranged so that the pulp suspension is serially floated in each of the cells of each of the second series for a respective time interval;

means for delivering a thinning liquid medium to the pulp suspension between the first and each of the second series of flotation cells for thinning the consistency of the pulp suspension for causing the pulp suspension to have a thinner consistency in each of the second series of cells than in the first series of cells.

5. The apparatus of claim 4, wherein the cells of the first series are approximately the same size as the cells of the second series.

6. The apparatus of claim 5, wherein the cells of the first series are all substantially the same size.

7. The apparatus of any of claims 4, 5 or 6, further comprising a joint secondary flotation cell following the second series of flotation cells and to which all of the separate second series of flotation cells are connected for removal of the floating material floated off the fibrous pulp suspension in the second series of flotation cells.

* * * * *